United States Patent [19]

Weaver

[11] Patent Number: 4,920,798

[45] Date of Patent: May 1, 1990

[54] LIQUID LEVEL SENDER WITH LINEAR FLOAT

[75] Inventor: Frank C. Weaver, Chicago, Ill.

[73] Assignee: Stewart Warner Instrument Corporation, Chicago, Ill.

[21] Appl. No.: 272,629

[22] Filed: Nov. 17, 1988

[51] Int. Cl.⁵ .................... G01F 23/30; G01F 23/60
[52] U.S. Cl. ....................... 73/313; 73/319; 73/322.5
[58] Field of Search .............. 73/313, 319, 322.5; 338/33; 200/257, 258, 260; 340/624, 623

[56] References Cited

U.S. PATENT DOCUMENTS

| | | | |
|---|---|---|---|
| 2,666,101 | 1/1954 | Ellithorpe | 200/257 |
| 3,266,312 | 8/1966 | Coleman et al. | 73/313 |
| 3,417,613 | 12/1968 | Barnstorf | 73/319 |
| 4,178,802 | 12/1979 | Yamamoto | 73/313 |
| 4,342,224 | 8/1982 | Hara et al. | 73/290 R |
| 4,692,576 | 9/1987 | Frede | 200/84 R |

FOREIGN PATENT DOCUMENTS

| | | | |
|---|---|---|---|
| 55312 | 7/1982 | European Pat. Off. | 73/313 |
| 152412 | 11/1981 | Fed. Rep. of Germany | 73/313 |
| 488624 | 10/1918 | France | 73/313 |
| 166216 | 10/1983 | Japan | 73/313 |
| 52721 | 3/1985 | Japan | 73/313 |
| 877001 | 9/1961 | United Kingdom | 73/322.5 |

Primary Examiner—William A. Cuchlinski, Jr.
Assistant Examiner—W. Morris Worth
Attorney, Agent, or Firm—Lorusso & Loud

[57] ABSTRACT

A fuel level sender including a vertically reciprocal foam float that carries a slideable dual contact member biased by springs in the float toward a thick-film resistor plate.

5 Claims, 4 Drawing Sheets

LIQUID LEVEL SENDER WITH LINEAR FLOAT

BACKGROUND OF THE INVENTION

Vehicular fuel level senders, as they are commonly called, are actually transducers that convert the level of fuel in the fuel tank into an electric signal to proportionally drive a visually readable electric instrument such as a bi-torque gauge. These fuel senders conventionally include a float carried on the end of a long pivoting arm suspended within the interior of the fuel supply tank, and this arm pivots a short wiper blade having a ball contact slideably engaging wires on a wound wire rheostat that varies in resistance in accordance with the position of the float and hence liquid level, however not always in directly proportional fashion. The angular position of the pivoting float arm, or more particularly the incremental angle of the arm, is not directly proportional to the vertical incremental change in float position and hence not directly proportional to liquid level. Moreover, in some cases, the instrument itself is not proportional throughout its range and requires some compensation.

Another cause for non-linearity is that fuel tanks frequently have non-symmetrical configurations because fuel tanks are frequently designed to fit into restricted envelopes within the vehicle. Irregular tank configurations thus introduce another non-linearity in sender readout and hence require compensation.

One way to compensate for these non-linearities is to vary the spacing between the wire turns on wound wire rheostats and more specifically by increasing wire turn spacing, the ratio of resistance change to float arm angle decreases, and conversely it increases with more tightly wound turns. Another common way of varying linearity is to change the individual turn lengths by modifying the shape of the support board on which the wire is wound. One common shape variation includes a tapered section in the form of a frusto-isosceles triangle.

This differential wire turn spacing as well as the wire turn length variation has created a problem because the wiper contact as it rides across the wire turns tends to pluck or "banjo" the loosely held wires and not infrequently causes rupture of the wire, which of course results in a complete failure in the rheostat.

The non-linearity produced by the pivoting float arm has been eliminated in some cases through the use of a vertically reciprocal float. The vertical float carries contact elements engageable with vertical straight wires, in one case, extending through the float so it produces incremental resistance changes directly proportional to incremental liquid level change and hence eliminates the inaccuracy produced by pivotal float arms. However, because the resistance elements in this design are wires, they have a uniform cross-section through their length and hence cannot compensate for the other non-linearities including fuel tank configuration. For this reason such fuel senders have not found widespread commercial success.

It is a primary object of the present invention to ameliorate the problems noted above in compensating for non-linearities in fuel sender.

SUMMARY OF THE PRESENT INVENTION

In accordance with the present invention, an improved compact fuel level sender is provided that includes a vertically reciprocating closed-cell foam float that carries a transversely slideable dual contact member biased by springs toward an adjacent stationary thick-film resistor plate. The thick-film resistor plate carries a pair of deposited thick-film sender resistors that can be of any desired configuration to compensate for non-linearities produced by irregular fuel tank configuration as well as other causes.

The float itself is reciprocably mounted on a support rod in an enclosing tube-like housing, and the rod permits the float to pivot somewhat in a horizontal plane. The dual contact member is also permitted slight pivotal movement also in a horizontal plane with respect to the float so that as the springs bias the contact member into engagement with the thick-film resistors, this limited pivoting action balances the forces urging the contact member toward the resistor plate.

The resistor plate is generally flat in configuration and has a ceramic substrate upon which generally vertical, spaces ground and sender resistors are deposited by electro-deposition, sputtering, or silk screening. The contact member is generally U-shaped in configuration with spaced sender and ground contacts carried on a front portion thereof with its side legs slideably mounted in the float. Two springs, one generally aligned with each of these contacts and mounted within the float, engage the U-shaped contact member urging it outwardly from the float toward the resistor plate.

Variations in thickness in the thick-film resistors, or the resistor plate itself, slight errors in contact protrusion from the contact member, and other inaccuracies in the manufacture of the float, the contact assembly, the springs and the resistors do not affect the distribution of forces on the contacts and the resistor plate, because the dual spring arrangement spaced on opposite sides of the axis of the float support rod, tend to "rock" the float about the post and balance the spring forces acting on the contact member.

Other objects and advantages of the present invention will appear from the following detailed description.

DETAILED DESCRIPTION OF THE PREFERRED EMBODIMENT

Figures 1, 2:
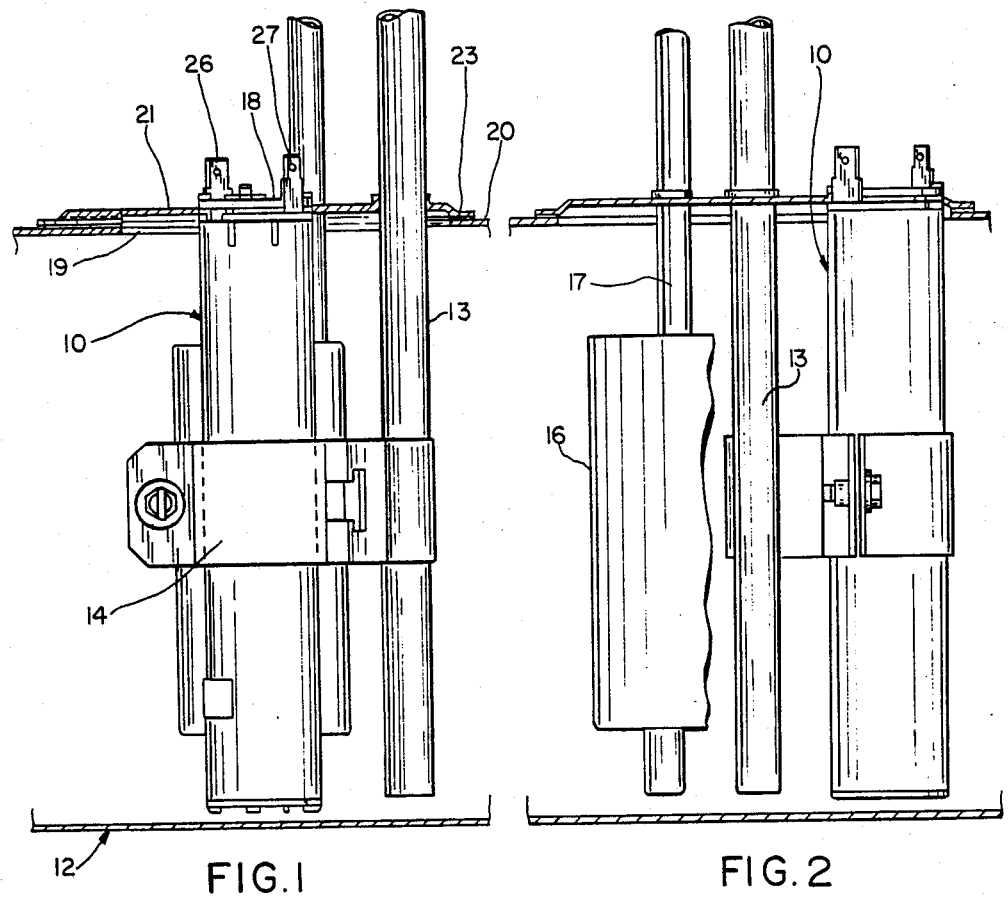
FIG. 1 is a front view of the present tubular liquid level sender assembly supported within a fragmented fuel tank.
FIG. 2 is a rear view of the present liquid level sender tube assembly supported within a fragmented fuel tank.
Figure 3:
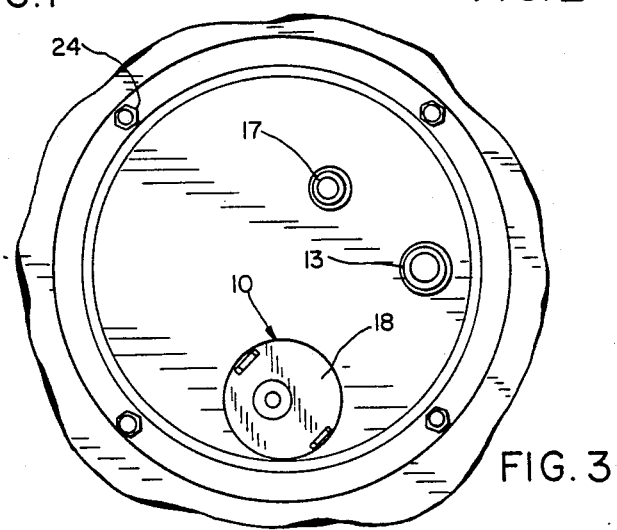
FIG. 3 is a top view of the tank illustrated in FIG. 1, showing the relative location of the sender, its support tube and a fuel pump.
Figure 4:
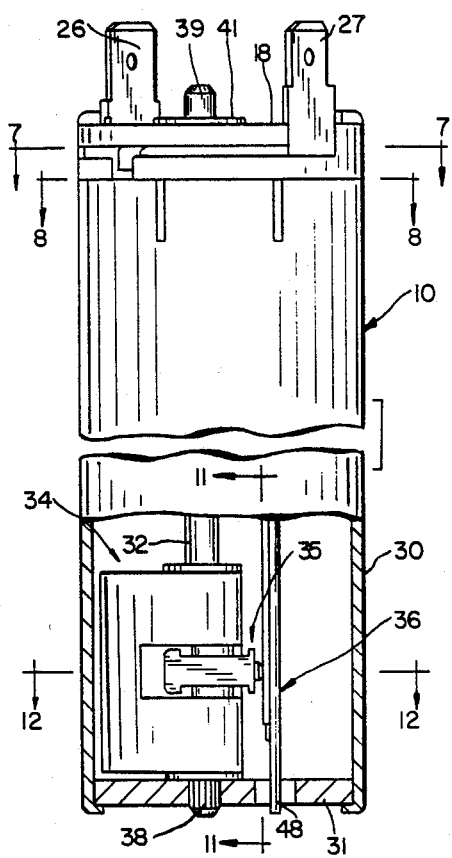
FIG. 4 is an enlarged fragmentary longitudinal section of the liquid level sender assembly illustrated in FIG. 1.
Figure 5:
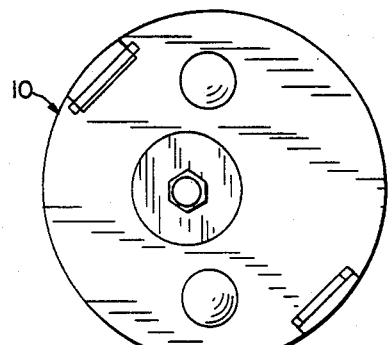
FIG. 5 is a top view of the liquid level sender assembly illustrated in FIG. 4.
Figure 6:
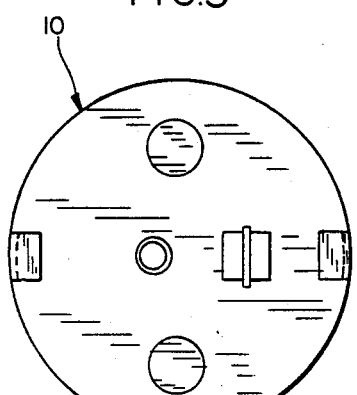
FIG. 6 is a bottom view of the liquid level sender assembly illustrated in FIG. 4.
Figure 7:
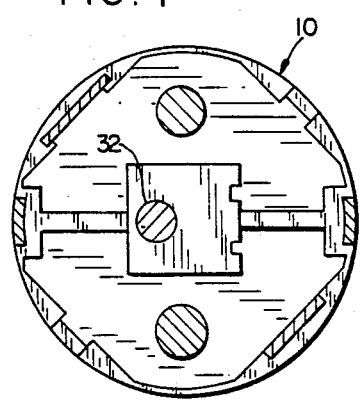
FIG. 7 is a cross-section of the liquid level sender assembly taken generally along line 7—7 of FIG. 4.
Figure 8:
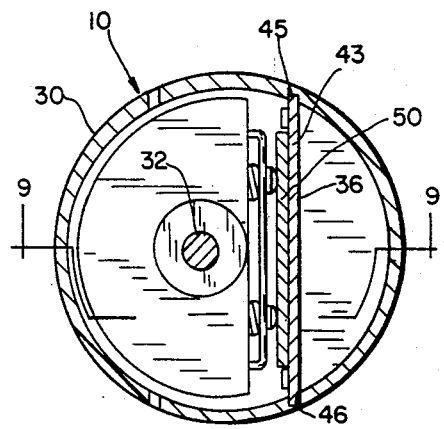
FIG. 8 is a cross-section of the liquid level sender assembly taken generally along line 8—8 of FIG. 4.

Referring to the drawings and particularly FIGS. 1 to 3, a compact unitary tube-like liquid level sender assembly 10 is illustrated according to the present invention shown mounted in a fuel tank 12 by a support rod 13 and a clamp assembly 14. The liquid level assembly 10 is supported separately from a fuel pump assembly 16 having its own support rod 17. Support rods 13 and 17 as well as top plate portion 18 of the fuel level assembly 10 project through a large opening 19 in tank top wall 20, closed by a circular stepped closure plate 21 sealed around the tank opening 19 by a gasket 23.

Closure plate 21 is fastened to top wall 20 by a plurality of fasteners 24 illustrated more clearly in FIG. 3.

Because the liquid level sender assembly 10 is cylindrical in configuration and has a relatively small diameter, it is much more easily mounted within the tank 12 than prior liquid level senders that have exposed pivotally mounted floats.

The top plate portion 18 has ground and sender terminals 26 and 27 projecting upwardly therefrom that are adapted to receive conventional connectors attached to conductors that extend into the vehicle's electrical system and provide an output proportional to the liquid level in tank 12.

Referring to remaining FIGS. 4 to 14 for a more detailed description of the internal parts and operation of liquid level sender assembly 10, it is seen to include a cylindrical metallic tube 30, roll staked over both a cylindrical bottom plate 31 and the multiple plate top plate portion 18 that hold the assembly 10 together as a unit.

The post 32 has knurled lower end 38 press-fitted in a bore in lower plate 31 and an upper end 39 held in position by a snap ring 41 on the top of top plate portion 18.

As seen more clearly in FIGS. 8, 9, 10 and 12, the resistor plate assembly 36 includes a rectangular aluminum backing plate 43 having upper outwardly extending tabs 45 and 46 and a lower downwardly projecting tab 48 that extend through complementary apertures in tube 30 and bottom plate 31 to lock the resistor plate assembly 36 in position in tube 30.

The forward face of backing plate 43 has a ceramic layer 50 bonded thereto that is generally vertical thick-film ground and sender resistors 51 and 53. Resistors 51 and 53 are deposited and bonded onto the ceramic substrate 50 by conventional techniques such as electrodeposition, sputtering, or silk screening.

Sender resistor 53 is connected to sender terminal 27 by a parallel adjacent resistor portion 55 and connector not shown in detail in the drawings and similarly ground resistor 51 is connected to ground terminal 26 by a suitable conductor.

While the resistors 51 and 53 are shown having uniform areas along their length, it should be understood that one or both of these resistors can be irregular in longitudinal configuration to compensate for non-linearities produced elsewhere in the system, including non-linearities in the instrument itself and those produced by irregular tank configuration.

The support rod 32 may be nickel plated steel or solid nylon to provide a sliding surface for the float assembly 34, illustrated clearly in FIGS. 9, 11, 12, 13 and 14. As seen clearly in FIG. 13, float assembly 34 includes a semi-annular closed cell foam float 58 preferably constructed or molded from a one-part foam such as one of the polyethylene foams and one of these found suitable in "Hycar".

The float 58 includes a semiannular rear surface 60 extending somewhat more than 180°, a flat top surface 61 and a flat parallel lower surface 62 and a vertical flat forward surface 63. Float 58 has a through-bore 65 offset on a radius extending from the geometric axis of tube 30. Bore 65 receives opposed nylon bushings 67 and 68 shown clearly in FIG. 13 that provide bearing surfaces for slideably mounting the float on rod 32. This mounting permits the float to pivot or swing about rod 32.

The float 58 slideably carries a generally U-shaped contact member 70 in the contact assembly 36. Contact member 70 includes a forward bite portion 71 and backwardly extending leg portions 72 and 73 slideable in rearwardly extending complementary recesses 75 and 76 in the front wall 63 and rear wall 60 of the float 58. The recesses 75 and 76 while generally guiding the contact member 70 for linear reciprocating motion toward and away from the resistor plate assembly 36, nevertheless permit the contact member 70 to pivot slightly in the plane of FIG. 12 because the contact member has a loose fit therein, and of course the float 58 is free to pivot about post 32.

The forward portion 71 of the contact member 70 carries spaces ground and sender contacts 78 and 79 preferably staked to the contact member, that have enlarged rear bosses 81 and 82 and they in turn provide forward seats for coil compression springs 84 and 85 mounted in parallel bores 87 and 88 in the float that serve to bias the contact member away from float forward wall 63 toward the resistor plate assembly 36 so that contact 78 firmly engages the ground resistor 51 and contact 79 firmly engages the sender resistor 53.

Because the float 58 is free to pivot about the axis of post 32 and spring 84 acts on one side of the post axis and spring 85 acts on the other side of the post axis, the forces acting on contacts 78 and 79 are always equal regardless of irregularities in the resistor assembly 36, the contact assembly 35, and the float assembly 34. This assures even contact wear and also assures good electrical contact at all times.

Figure 9:
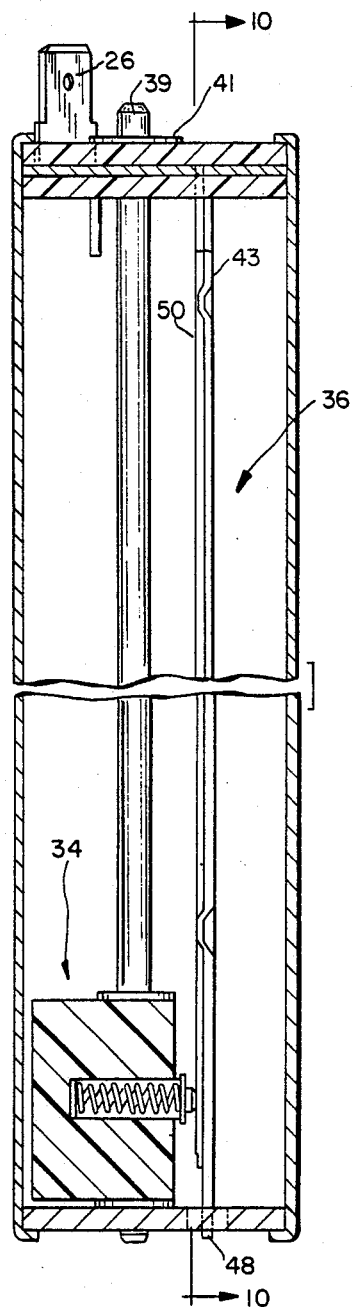
FIG. 9 is a longitudinal section of the present liquid level sender assembly taken generally along line 9—9 of FIG. 8.
Figure 10:
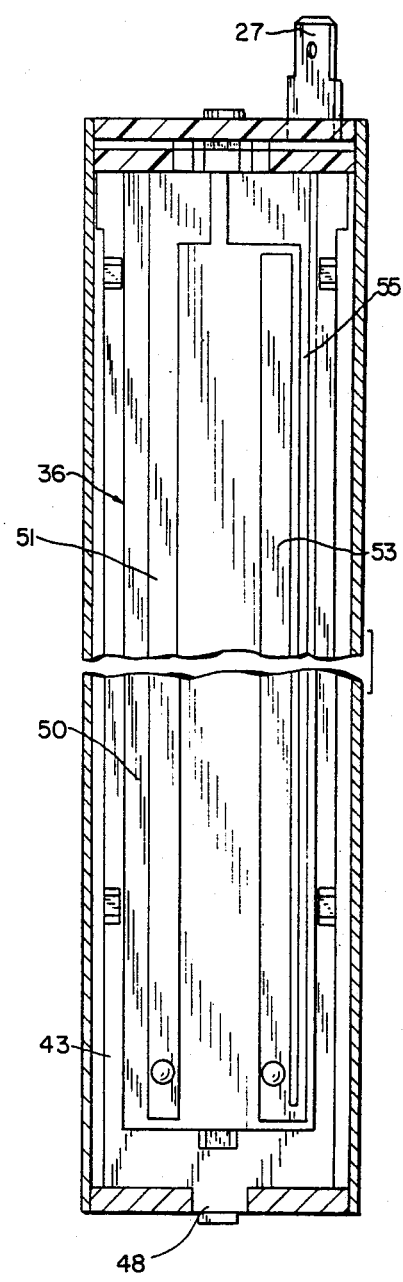
FIG. 10 is a longitudinal section of the liquid level sender assembly taken generally along line 10—10 of FIG. 9, showing the resistor plate.
Figure 11:
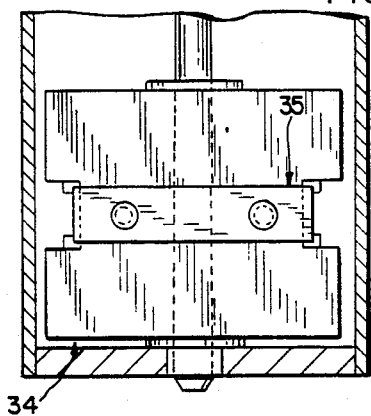
FIG. 11 is a fragmentary longitudinal section illustrating the front of the float and contact member taken generally along line 11—11 of FIG. 4.
Figure 12:
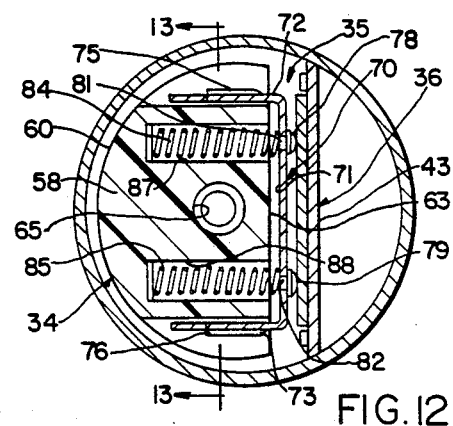
FIG. 12 is a cross-section illustrating the contact member mounting in the float taken generally along line 12—12 of FIG. 4.
Figure 13:
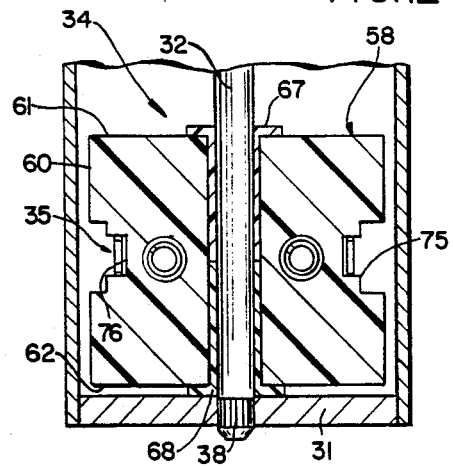
FIG. 13 is a fragmentary longitudinal section illustrating the spring and contact member mounting in the float taken generally along line 13—13 of FIG. 12.
Figure 14:
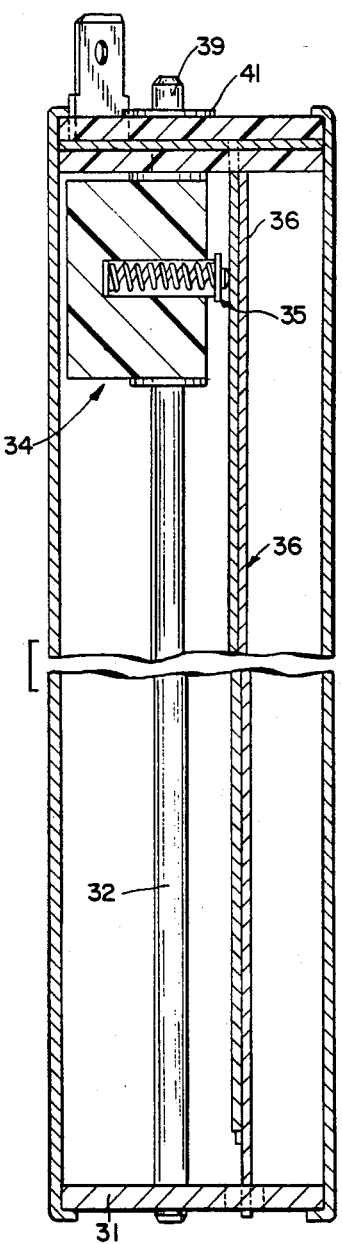
FIG. 14 is a longitudinal section of the liquid level sender assembly similar to FIG. 9 with the float in its raised position.

As shown in comparing FIGS. 9 and 14 and the resistor configuration illustrated in FIG. 10, it can be readily seen that as the float assembly 34 moves upwardly, sender resistance can increase or decrease.

What is claimed:

1. A liquid level sender for use in conjunction with an electrical circuit comprising:
   a generally cylindrical support tube with a vertical support rod fixed therein;
   a thick-film resistor plate mounted vertically in the tube having a thick-film sender resistor and a thick-film ground resistor on one side thereof;

means for placing said sender resistor in electrical communication with the electrical circuit and means for placing said ground resistor in electrical communication with ground;

a foam float in the tube slideably mounted on the support rod and permitted limited pivotal movement thereabout;

a generally U-shaped contact member having arms mounted for movement in and generally transverse to the float toward and away from the resistor plate, a sender contact proximate one end at a base portion of the contact member engagable with the sender resistor and a ground contact proximate a second end of said base portion on the contact member engagable with the ground resistor;

a first spring in the float biasing said one end of the contact member toward the resistor plate and a second spring biasing the second end of the contact member toward the resistor plate, said contact member being mounted for limited pivotal movement in the float in its own plane.

2. A liquid level sender as defined in claim 11, wherein the float is a closed cell polymer form.

3. A liquid level sender as defined in claim 1, wherein the resistor plate includes a backing plate with said thick-film resistors thereon.

4. The liquid level sender as set forth in claim 1, wherein said means for placing said sender resistor in communication with the electrical circuit is a sender terminal located on top of said support tube, said sender resistor being connected to said sender terminal via a parallel adjacent resistor portion.

5. The liquid level sender as set forth in claim 1 wherein said means for placing said ground resistor in communication with ground is a ground terminal, said ground resistor being connected to said ground terminal via a suitable conductor.

* * * * *

UNITED STATES PATENT AND TRADEMARK OFFICE
CERTIFICATE OF CORRECTION

PATENT NO. : 4,820,798
DATED : April 11, 1989
INVENTOR(S) : Hefner, Jr.

It is certified that error appears in the above-identified patent and that said Letters Patent is hereby corrected as shown below:

Col. 2, line 7; change "(2)" to --(1)--

Col. 3, line 59; change "ae" between "x" and "as hereinbefore" to --are--.

Col. 7, line 26; change the "n" between "n and" and "are" to --n"--.

Col. 7, line 43; delete :

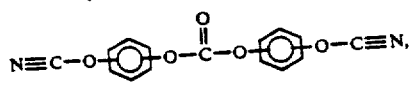

and replace with:

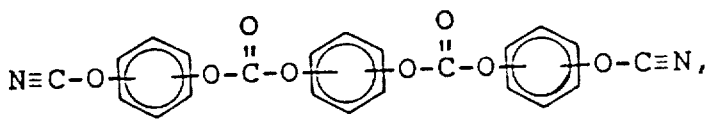

Col. 8, line 61; change " (XXXI) " to --(XXI)--.

Col. 9, line 45; change "anhydides" to --anhydrides--.

UNITED STATES PATENT AND TRADEMARK OFFICE
CERTIFICATE OF CORRECTION

PATENT NO. : 4,820,798

DATED : April 11, 1989

INVENTOR(S) : Hefner, Jr.

It is certified that error appears in the above-identified patent and that said Letters Patent is hereby corrected as shown below:

Col. 18, line 30; change "copoly1(2-" to --copoly)2- --.

Signed and Sealed this

Twenty-first Day of August, 1990

Attest:

HARRY F. MANBECK, JR.

*Attesting Officer*     *Commissioner of Patents and Trademarks*